INVENTORS,
HAROLD JACOBS
RONALD C. HOFER &
GEORGE E. MORRIS.

Sept. 24, 1968  H. JACOBS ET AL  3,403,399
MILLIMETER WAVE IMAGING SYSTEM
Filed March 10, 1967  5 Sheets-Sheet 3

INVENTORS,
HAROLD JACOBS
RONALD C. HOFER &
GEORGE E. MORRIS.

BY Harry M. Saragovitz,
Edward J. Kelly, Herbert Berl
& Julian C. Keppler
ATTORNEYS

INVENTORS,
HAROLD JACOBS
RONALD C. HOFER &
GEORGE E. MORRIS.

United States Patent Office 3,403,399
Patented Sept. 24, 1968

3,403,399
MILLIMETER WAVE IMAGING SYSTEM
Harold Jacobs, West Long Beach, N.J., Ronald C. Hofer, Brookville, Ind., and George E. Morris, Long Branch, N.J., assignors to the United States of America as represented by the Secretary of the Army
Filed Mar. 10, 1967, Ser. No. 623,194
14 Claims. (Cl. 343—17)

ABSTRACT OF THE DISCLOSURE

A visual presentation of a millimeter wave image formed on a layer of dielectric material or semiconductor of critical geometry is achieved by controlling over a wide range the magnitude of the millimeter wave radiation reflected from said layer by sequentially changing the conductivity of discrete regions of said layer under the influence of external scanning means, detecting the radiation so reflected, and applying the detected output to a visual indicating device the scanning of which is synchronized with said scanning means.

Cross-references to related applications

One of the reflecting modes of operation of the system according to the invention relies upon reflection of energy from a semiconductor associated with a fixed reflector. Such a reflection technique is shown in an application of Harold Jacobs, Ser. No. 504,295, now Patent No. 3,305,863 entitled "Variable Reflector of Electromagnetic Radiation," filed Oct. 22, 1965.

Background of the invention

This invention relates to a millimeter wave imaging system which will present a visible image of objects upon which millimeter wave energy is incident. As used in this application, "millimeter wave energy" shall be construed to include energy lying in the microwave region, as well as in the far infrared region of the electromagnetic spectrum.

The need exists for a device by means of which one can see through fog, heavy rain or snow; the most difficult problem is visibility through fog. Despite the numerous television or panel vision systems presently using light at optical frequencies or infrared radiation, the scattering by water particles in the fog renders these systems impractical. Radar light imaging at the longer microwave wavelengths for fog penetration is quite possible; in principle, however, the bulk, complexity and cost of radar viewing systems for image definition has made this approach impractical. At this time, airplanes and vehicles have little protection in heavy fog other than altimeters and radar ranging and have no visual means of imaging through fog for protective purposes so that collisions of both planes and ground vehicles still occur in fog. Furthermore, the problem of military surveillance in deep fog has not yet been solved in searching for troops, transporting vehicles, aircraft or missiles.

In accordance with the invention, electromagnetic radiation in the millimeter or submillimeter wave region impinges upon one or more targets. A portion of this radiant energy is reflected from the target and is collected by a lens or parabola and focused onto a semiconductor panel. The conductivity of discrete regions of the semiconductor panel is changed sequentially by means of a scanning light beam, an electron beam, or by any other mechanism which provides control of the conductivity in localized regions of the semiconductor. Scanning with a light beam has been found to be the simplest and most economical means for producing conductivity changes in a semiconductor panel.

As the scanning light beam momentarily illuminates a given region of the semiconductor, the conductivity of the semiconductor in that region is increased. If the semiconductor panel of a given conductivity is cut to a critical thickness, corresponding to the frequency of the millimeter wave radiation, a relatively large change in reflection of incident millimeter wave radiation can be achieved as the region goes from the "dark" or quiescent condition to the illuminated condition. If the conductivity of a given region of a semiconductor is increased, as by illumination with light from a scanner, the proportion of the millimeter wave energy incident upon the panel which is absorbed by said region of the panel increases. In other words, the amount of millimeter wave energy incident upon said region of the panel, if any, which is reflected from said region is increased. Millimeter wave detecting means is set up in front of the semiconductor panel to detect the millimeter wave energy reflected.

As momentary and sequential scanning of discrete regions of the semiconductors occurs, changes in the millimeter wave energy emanating from these discrete regions are detected by the millimeter wave detector, amplified and applied to a visual display device. For example, if a cathode ray oscilloscope is used as the visual display device, the amplified output of the millimeter wave detector can be applied to the Z axis of the cathode ray oscilloscope and the position of the electron beam of the cathode ray oscilloscope can be correlated with the position of the discrete region of the semiconductor panel undergoing an increase in conductivity by synchronizing the scanning light beam with the vertical and horizontal deflection circuits of the oscilloscope. When the electron beam is made to scan a raster in synchronization with the line by line scanning of the light beam on the semiconductor, and when the electron beam intensity of the cathode ray oscilloscope is modulated with the fluctuating signal received at the millimeter wave detector, the entire millimeter wave image at the semiconductor panel can be converted to a visual display.

A system for converting an imaged formed by infrared radiation to a visible image is discussed in an article, "Electronic Scanning System for Infrared Imaging" by M. E. Lasser, P. H. Cholet, and R. B. Emmons in Proc. IRE, December 1955, pages 2069–2075. In this system, an infrared image of an object to be viewed is formed on a semiconductor infrared-transparent window at one end of a first tube. A second tube joined to the first tube contains an electron gun which provides a beam which can be focused on the semiconductor window. When the electron gun is inoperative, the infrared radiation continues through the semiconductor window and is intercepted by an infrared detector. When the electron beam is turned on and is swept over the semiconductor, on the other hand, the conductivity of the semiconductor is increased and transmission of infrared radiation through the semiconductor is decreased.

Summary of the invention

An object of this invention is to provide an optical imaging device which is simple in nature, low in cost, and in which an observer can obtain a visual moving picture of the terrain and surrounding environment, even in heavy snow, rain, or deep fog. The system of the invention uses millimeter wave energy which has been found by tests in experimental all-weather communication links to be characterized by relatively little atmospheric attenuation.

One of the disadvantages of the previously mentioned system of Lasser et al. is that the change in the transmission of infrared radiation is comparatively small and requires extremely large changes in conductivity to obtain usable effects. This, in turn, necessitates use of a rather high energy source of visible light or an electron beam to create the required density of free carriers. Also, the conductivity $\sigma$ is inversely proportional to frequency squared so that $\sigma$ would be lower as the frequency increases; this would further worsen the problem presented in the Lasser et al. system.

Instead of controlling the amount of millimeter wave energy transmitted through the semiconductor, as in the system of Lasser et al., and detecting variations in transmission of radiation, the system of the invention is predicated upon controlling the amount of millimeter wave energy reflected from the semiconductor panel and sensing the variations in reflected millimeter wave energy.

It has been found that, for a given level of energy used in scanning the surface of the semiconductor panel, the resulting change in the amount of millimeter wave energy reflected from the semiconductor panel is greater than the change in energy transmitted through said panel, such as would be obtained with the system of Lasser et al. In addition, in the millimeter wave imaging system of the invention, selection of a critical thickness of a semiconductor panel allows one to maximize the change in amount of millimeter wave energy emanating from the semiconductor with change in conductivity. In other words, by using a reflection system and by making the semiconductor thickness critical, the modulation depth is superior to that obtained with the transmission system of Lasser et al. already described.

Since the amount of optical energy needed for changing the level of the millimeter wave energy emanating from the semiconductor panel a given amount is much less than with the electron beam bombardment used by Lasser et al., a much simpler scanning system can be used; in one instance, the light from a small flashlight bulb was found to provide sufficient conductivity change for satisfactory system operation.

As will be described in greater detail subsequently, there are three basic techniques for using the reflecting mode of operation.

First, one may control the reflection of millimeter wave energy from the front face of a semiconductor panel of critical thickness equal to an integral number of half wavelengths (the wavelength here being the wavelength for the particular semiconductor used and differing from that of free space by the reciprocal of the square root of the dielectric constant of the semiconductor). The amount of millimeter wave energy directed at the detector in the quiescent state (no scanning) is considerably less than would be the case in a system, such as that of Lasser et al., which operates in the transmission mode. This results in an improvement of the signal-to-noise ratio and minimizes adverse effects upon coherent interference present in the transmission mode of operation. Moreover, for a given change in signal brought about by scanning, a greater change in reflection coefficient is achieved than with the transmission mode.

A second reflection mode of operation involves placing a fixed back reflector in contact with the semiconductor panel. The thickness of the semiconductor is chosen to be an odd number of quarter wavelengths, the wavelength again being the wavelength for the particular semiconductor being used. The choice of which multiple of a quarter wavelength to be used will be determined by the properties of the material, such as a quiescent (dark) conductivity $\sigma$ and the dielectric constant $\epsilon_R$ and a choice is made to give maximum response. By addition of the back reflector to the semiconuctor panel assembly, the sensitivity of this second reflection mode of operation is superior to that of the first reflection mode of operation described.

A more sophisticated reflection mode of operation involves replacing a fixed back reflector by a movable reflecting screen spaced from the semiconductor panel by an amount which can be varied to provide minimum reflection in the quiescent condition of the panel. This type of operation, in addition to having the advantages enumerated for the previously mentioned reflection operating modes, permits considerably more design flexibility, since, for any given semiconductor available, and, hence, for any reasonable value of quiescent conductivity $\sigma$, a proper semiconductor thickness L may be selected from the relationship $$\tanh \alpha L = \frac{1}{\sqrt{\epsilon_R}}$$

where $\alpha$ is the attenuation constant in the semiconductor and $\epsilon_R$ is the dielectric constant of the semiconductor, from which $$\alpha L = \tanh^{-1} \frac{1}{\sqrt{\epsilon_R}}$$

The term $\alpha$ is given by the following relationship $$\alpha = \frac{\sigma Z_s}{2}$$

where $\sigma$ is the conductivity of the semiconductor in reciprocal ohm-meters and $Z_s$ is the bulk impedance of the semiconductor which is equal to the impedance of free space divided by the square root of the dielectric constant of the semiconductor. Consequently, $$\frac{\sigma Z_s}{2} L = \tanh^{-1} \frac{1}{\sqrt{\epsilon_R}}$$

or, $$\sigma L = \frac{2}{Z_s} \tanh^{-1} \frac{1}{\sqrt{\epsilon_R}}$$

For a given semiconductor material, $\sigma L$ is a constant.

It should be noted that the thickness L of the semiconductor still is critical, but that it can be adjusted for maximum change in reflection coefficient with changes in illumination intensity. The change in conductivity with changes in illumination intensity is chiefly governed by the materal properties and by the thickness L. The foregoing relation for L is used to find a proper L for a given $\sigma$ which will give the minimum reflection in the quiescent condition. Consequently, the change in $E_R/E_{IN}$, the reflection coefficient, is maximum for a given change in $\sigma$ when said relation is satisfied. Should values of L be used which do not satisfy this $L=$constant relation, then the amount of quiescent reflection will be more than the minimum value possible; and, hence, the change in $E_R/E_{IN}$ will be less for a given change in conductivity. It will be noted also that the thickness L now need not be strictly held to $$\frac{(2n+1)\lambda_s}{4}$$

as in the case of the reflection mode with fixed back reflector. Now that values of $\sigma$ and L have been established, the spacing M between the reflecting screen and the semiconductor is adjusted to the value given by second relationship $$\tan \frac{2\pi}{\lambda_s} L \tan \beta_o M \frac{1}{\sqrt{\epsilon_R}}$$

where $\lambda_s$ is the wavelength in the semiconductor $\beta_o$ is the propagation constant in free space and equals the ratio of $2\pi$ and the wavelength $\lambda_o$ in free space. Values for M which give minimum reflection must satisfy the relation obtained from the equation $$\frac{2\pi}{\lambda_o} M = \tan^{-1} \left( \frac{1}{\sqrt{\epsilon_R} \tan \frac{2\pi L}{\lambda_s}} \right) + n\pi$$

from which $$M = \frac{\lambda_o}{2\pi} \tan^{-1} \frac{1}{\sqrt{\epsilon_R} \tan \frac{2\pi L}{\lambda_s}} + \frac{n\lambda_o}{2}$$

From this transcendental relationship, one can obtain values of M which will provide for optimum reflection. The solution for M in this transcendental equation will be spaced at intervals of one-half wavelength in free space.

By choice of the value of M, one can position the movable reflector to obtain the minimum reflection for the quiescent condition. With the movable reflector system, any semiconnductor, regardless of its quiescent or dark conductivity, can be selected so long as the first mathematical relationship is satisfied. The adjustment of M will compensate for the fact that the thickness L is not an odd number of quarter wavelengths. The adjustment of the spacing M thus permits tuning for zero reflection and results in a much more flexible millimeter imaging system.

*Description of the preferred embodiments*

Figure 1:
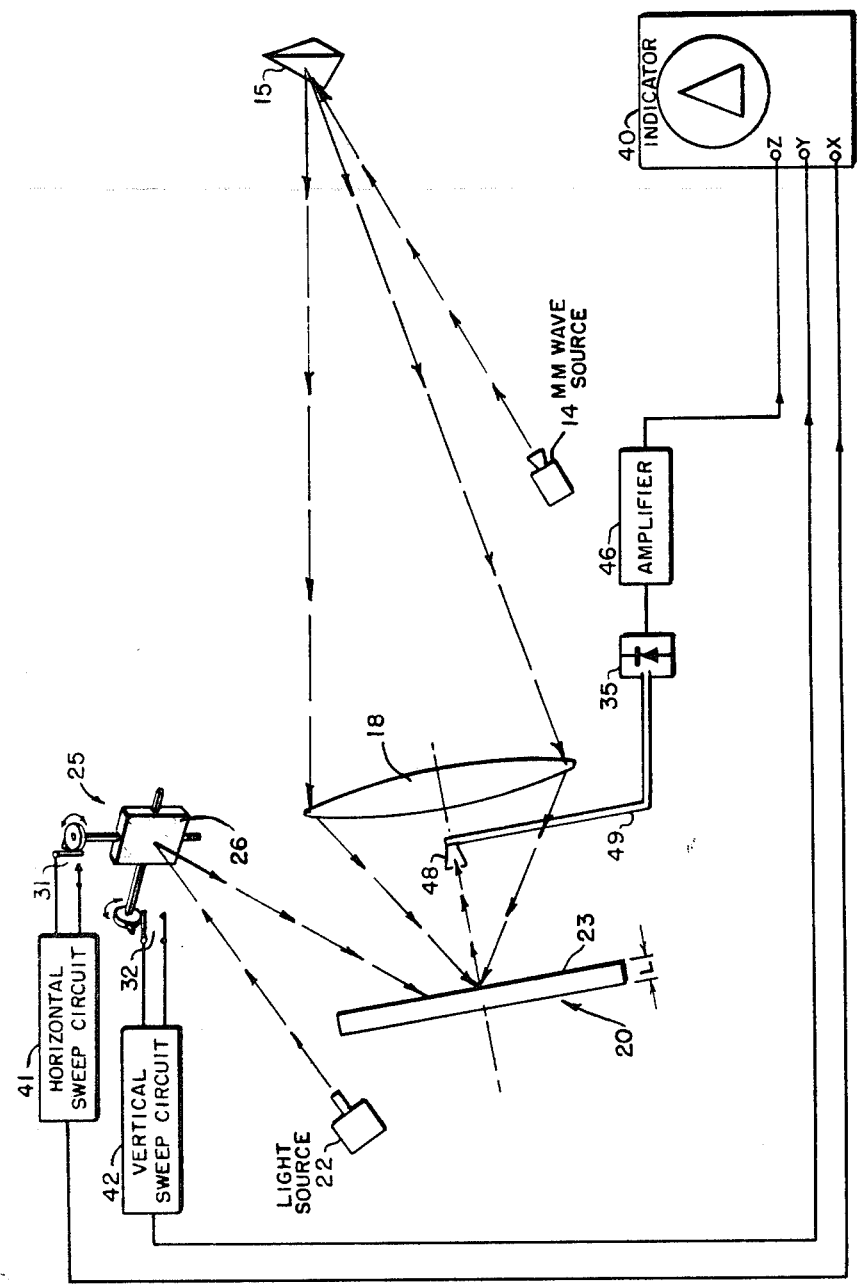
FIG. 1 is a system diagram showing a first embodiment of the invention.
Figure 2:
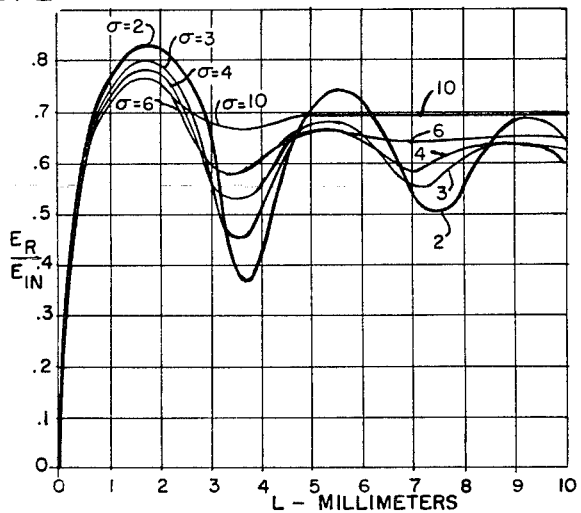
FIG. 2 shows curves illustrating relationship between the reflection coefficient and thickness of a semiconductor such as used in the system of FIG. 1.

A millimeter wave imaging system is shown in FIG. 1. This system makes use of the fact that the conductivity of the semiconductor 20 of FIG. 1 can be changed in regions impinged upon by the millimeter wave radiation by simultaneous scanning of the semiconductor with a visible light beam, by an electron beam, or, in some cases, by direct injection of excess minority carriers. As the conductivity of the semiconductor is varied by electronic means, reflectivity of the semiconductor device will change. In this reflecting mode, some of the incident energy on the semiconductor is transmitted through the semiconductor, while portions of the incident energy is reflected from the interface of free space and the semiconductor. The magnitude of the reflection coefficient, that is, the ratio of the reflected electric field intensity $E_R$ to the electric field intensity $E_{IN}$ in air incident upon the semiconductor surface is a function of the conductivity $\sigma$ and of the thickness L of the semiconductor. Typical curves of the reflection coefficient $E_R/E_{IN}$ versus thickness L of the semiconductor, for various values of conductivity $\sigma$, are shown in FIG. 2. These curves were obtained for a germanium semiconductor at $10^{10}$ Hertz. The wavelength $\lambda_s$ in the semiconductor at $10^{10}$ Hertz thus is $$\lambda_s = \frac{\lambda_o}{\sqrt{\epsilon_R}} = \frac{\frac{3 \times 10^8}{1 \times 10^{10}}}{\sqrt{16}} = 0.0075 \text{ meters} = 7.5 \text{ mm}.$$

Background material relating to these curves can be found in an article by H. Jacobs, F. A. Brand, J. D. Meindl, S. Weitz, R. Benjamin and D. A. Holmes entitled "New Microwave Techniques in Surface Recombination and Lifetime Studies" in April 1963 Proc. IRE, pages 581–592.

It will be noted from FIG. 2 of the drawing, that, when the semiconductor thickness L is given by $L = n\lambda_s/2$ where $n = 1, 2, 3 \ldots$ there will be minimum reflection.

When L is an odd multiple of quarter wavelengths long, however, that is, when $$L = \frac{2n+1}{4}\lambda_R$$

where $n = 0, 1, 2, 3, \ldots$ the reflection of energy is maximum. In practice, one would cut the semiconductor panel to a thickness $L = n\lambda_s/2$, $n$ being chosen to achieve minimum reflection. In the example shown by the curves of FIG. 2, this would means that $L = 3.75$ millimeters. It will be noted that, in the example illustrated in FIG. 2, the maximum swing in the coefficient of reflectively $$E_R/E_{IN}$$

is attained, for a given change in conductivity, when the thickness L of the semiconductor equals $\lambda_s/2$. In the example of FIG. 2, $E_R/E_{IN}$ changes from 0.37 to 0.68 when $\sigma$ changes from 2 to 10 (ohm-meter)$^{-1}$, representing an increase of reflected energy by a factor of $$(.68/.37)^2 = (1.83)^2 = 3.85$$

In the system of FIG. 1, millimeter wave energy from a millimeter wave source 14 strikes an object 15 and a portion of this energy is reflected from the object. The reflected millimeter wave energy is collected and brought to a focus onto a semiconductor panel 20 of thickness L by a large diameter condensing lens 18. The diameter D of the lens 18 will be approximately equal to the ratio of the radiation wavelength $\lambda_o$ and the angular separation in radians of two objects to be separated or resolved. For example, if $\lambda_o$ is in the region of 1 to 3 millimeters, and the lens diameter were one meter, $\lambda_o/D$ would range from .001 to .003 radian and one could resolve distances from 1 to 3 feet at one thousand feet distance from lens to object.

The semiconductor panel can be a layer of dielectric material the conductivity of which can be varied by external excitation. Examples of such a material are semiconductors such as germanium, silicon, or cadmium sulfide. The semiconductor should have high resistivity and long lifetime for excess minority carriers, germanium meets these requirements. More important, however, is that the thickness of the semiconductor be an integral number of portions of a wavelength in the semiconductor to optimize transmission of millimeter wave energy through the semiconductor panel and to increase the change in reflection coefficient $E_R/E_{IN}$ with changes in semiconductor sensitivity.

As the millimeter wave energy impinges upon the semiconductor panel 20, a millimeter wave image (variable energy density distribution) will be formed on the semiconductor of configuration depending upon the configuration of the object 15 being illuminated by the millimeter wave source and of intensity depending in part upon the reflectivity of the various portions of the object 15. As mentioned earlier, the conductivity $\sigma$ of the semiconductor panel 20 can be increased by directing light from a light source 22 onto the semiconductor panel. As shown in FIG. 1, the light is caused to scan the front surface 23 of the semiconductor panel 20 so that the conductivity $\sigma$ of a first region of the panel 20 is increased momentarily as the light scans that given region. Millimeter wave energy reflected from the semiconductor panel 20 can be picked up, as by a horn 48, and fed to a microwave diode detector 35 by way of a waveguide 49. The horn and waveguide combination, although disposed in front of the semiconductor panel 20, is quite small in area compared with the area of opening of lens 18 and will not appreciably block the energy reflected from the object or objects from impinging upon the semiconductor panel 20. The output of detector 35 is amplified by amplifier 46 and applied to the Z axis of the cathode ray tube indicator 40. The scanning may be accomplished by a flying spot scanner 25 which is capable of detecting a beam of light in a television-like raster by mechanical or electromechanical means. An example of such a scanner is the moving plane mirror spot scanner shown in FIG. 2 of an article "Infrared Search System Design Considerations" by R. H. McFee appearing in the September 1959 Proc. IRE and described at pages 1550–1552 of said article. The scanner 25, for example, may comprise a mirror 26 disposed in the path of light energy from light source 22; the mirror 26 can oscillate about one axis while nodding about another axis perpendicular to the first axis. It is possible, of course, to use two separate mirrors, each scanning independently about two mutually perpendicular axes. Each time the mirror 26 has reached a position such that the light spot is directed onto a certain location on the semiconductor panel 20, for example, the upper lefthand corner of panel 20, switches 31 and 32 may be closed to trigger the necessary horizontal and vertical sweep voltages for the cathode ray tube 40. These sweep voltages are generated by horizontal sweep circuit 41 and vertical sweep circuit 42, respectively. The cathode ray tube sweep thus is synchronized with the motion of the light scanner. If there is millimeter wave energy incident upon the aforesaid first region of the semiconductor panel thus illuminated by light from the scanner, then the amount of millimeter wave energy absorbed by the first region of the semiconductor panel 20 will increase. This follows from the fact that the light has increased the carrier concentration of the semiconductor, thereby increasing the conductivity $\sigma$ of the semiconductor. Less millimeter wave energy will be reflected from the light-illuminated first region of the panel 20 and the output of detector 35 will diminish during the period that light is incident upon the first region of semiconductor panel 20. As the light spot leaves said first region, this region returns to its previous conductivity condition. As the moving spot of light strikes a second discrete region of the semiconductor panel, the value of $\sigma$ of this second region will be increased. If millimeter wave energy impinges upon this second region, partial absorption of such energy will again occur. Of course, if there is no millimeter wave energy incident upon the aforesaid first and second regions, the variation in the output of detector 35 will be zero. It should be noted that other types of scanning systems may be used; such systems are well known in the art.

In order to obtain a presentation of the microwave image on the semiconductor panel 20, a visual indicating means such as cathode ray tube 40 must be used. The output from detector 35 is connected to the intensity control grid of cathode ray tube 40, while the outputs of the sweep generators 41 and 42 are connected to the deflection circuits of the cathode ray tube so that, at any given instant, the position of the phosphorescent trace on the cathode ray tube screen corresponds to the position on the semiconductor panel 20 at which a spot of light from scanner 25 and millimeter wave energy are simultaneously incident.

If the thickness of the semiconductor panel were $\lambda_s/2$ or 3.75 millimeters, in the case of a germanium panel at $10^{10}$ Hertz, it is evident from the curves of FIG. 2 that, for regions of the panel not illuminated by the scanning light beam, a relatively small amount of the microwave energy incident on the panel would be reflected from the panel 20 and be detected by detector 35. If the same region of said panel were illuminated with light, however, the conductivity $\sigma$ of that region of the panel would increase and the amount of microwave energy reflected would increase substantially. Consequently, as each discrete region of the semiconductor panel is scanned by light, the input to the intensity control grid of the display tube 40 would increase. With this setup, therefore, there is no need for an inverter, as would be the case with operation in a transmission mode, similar to that shown by the Lasser et al. article.

It should be noted from the curves of FIG. 2 that the largest change in reflectivity $E_R/E_{IN}$, for a given change in $\sigma$, occurs when the thickness L of the semiconductor panel is $\lambda_s/2$. The ratio of the change in reflectivity and the change in conductivity at $L=\lambda_s$ is not as large as the same ratio of $L=\lambda_s/2$. Moreover, it will be noted that the swing in the reflection coefficient encountered when $L=\lambda_s/4$, $3\lambda_s/4$ and $5\lambda_s/4$ is much less than the swing encountered when $L=\lambda_s/2$ and $\lambda_s$. Finally, the manner in which reflectivity changes with increasing conductivity $\sigma$ is inverted as the thickness L is changed from an even multiple to an odd multiple of quarter wavelength, and vice versa. For example, at $L=\lambda_s/4$, the reflectivity decreases from .82 to .76 as $\sigma$ is increased from 2 to 10. At $L=\lambda_s/2$, however, the reflectivity increases from .37 to .68 as $\sigma$ is increased from 2 to 10.

Figure 3:
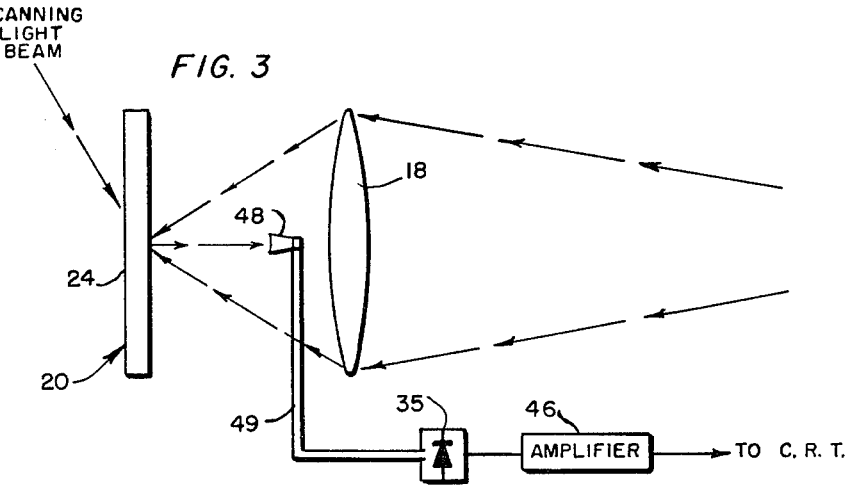
FIG. 3 is a fragmentary view showing a modification of the system of FIG. 1.

In FIG. 3, the scanning light beam from scanner 22 is indicated as illuminating the back surface 24 of the semiconductor 20, instead of the front surface, as in the system described in FIG. 1. It is immaterial, however, which of these two surfaces of the semiconductor is illuminated.

Figure 4:
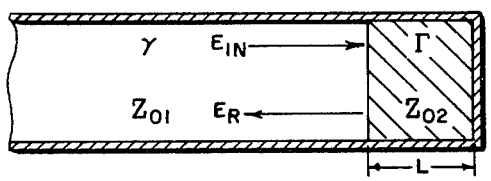
FIG. 4 is a view explaining reflection of energy from a semiconductor having a fixed metal reflector backing the semiconductor.
Figure 5:
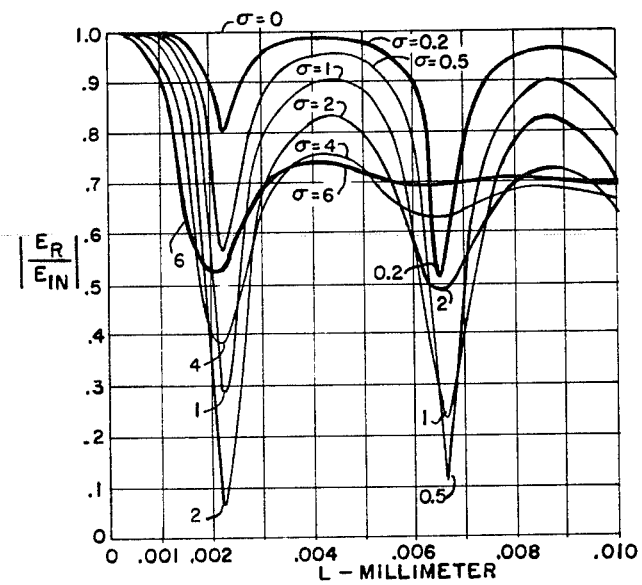
FIG. 5 illustrates the manner in which the reflection coefficient varies with thickness of a semiconductor, for various values of conductivity, for the case of a semiconductor backed by a fixed reflector.

In an application of Harold Jacobs, Ser. No. 504,295, entitled "Variable Reflector of Electromagnetic Radiation," filed Oct. 22, 1965, a three-layer reflection system is shown and described which includes air of propagation constant $\gamma$ and wave impedance $Z_{01}$, a semiconductor with propagation constant $\Gamma$ and wave impedance $Z_{02}$ and a metal reflector in the order named. Such a system is shown in FIG. 4 of the drawing and also is described in an article "Semiconductor Reflection Type Microwave Modulator," by H. Jacobs, R. W. Benjamin and D. A. Holmes, appearing at pages 699–708 of Solid-State Electronics, Pergamon Press, 1965, vol. 8. The electric field of the electromagnetic radiation incident upon the semiconductor is indicated as $E_{IN}$. The wave undergoes multiple reflections in the semiconductor and the reflected wave is designated as $E_R$. The ratio $E_R/E_{IN}$, that is, the reflection coefficient, is a function of both the thickness L, dielectric constant $\epsilon_R$, and conductivity $\sigma$ of the semiconductor. The semiconductor is mounted in contact with a metal reflector. To measure performance of such a system, the semiconductor of thickness L can be mounted at the closed end of a waveguide, as indicated in FIG. 4. Curves have been obtained with such an arrangement showing the manner in which semiconductor reflectivity $E_R/E_{IN}$ can be varied as a function of both the semiconductor conductivity $\sigma$ and the thickness L of the semiconductor. Typical curves are shown in FIG. 5 for a silicon sample with an operating frequency of $10^{10}$ Hertz, corresponding to a free space wavelength of 3 centimeters. The dielectric constant of silicon is assumed to be 12 and the wavelength in silicon is $30/\sqrt{12}=8.67$ millimeters.

From transmission line theory, the minima in the reflection coefficient $E_R/E_{IN}$ can be shown to occur near the odd quarter wavelength points and the smaller the conductivity the better is the approximation. In FIG. 5, the reflection coefficient is unity at $\sigma=0$. In other words, there is no loss at $\sigma=0$ and all of the incident energy is reflected from the metallic reflector. In FIG. 5, the minimum reflectivity at each value of $\sigma$ occurs when the semiconductor thickness is substantially a quarter wavelength in the semiconductor at the operating frequency. At $\sigma$ equal 2, the minimum reflectivity occurs when the thickness L of the semiconductor is 2.2 millimeters. It is shown in the aforesaid Solid-State Electronics article that the reflectivity $E_R/E_{IN}$ and consequently, the reflected energy $(E_R/E_{IN})^2$ will be a minimum when the following relation occurs:

$$\tanh \frac{\sigma Z_s L}{2} = \pm \frac{1}{\sqrt{\epsilon_R}}$$

Where $Z_s$ is the impedance of the infinite semiconductor and is equal to 377, the impedance of free space, divided by the square root of the dielectric constant $\epsilon_R$ of the semiconductor. From the above relation, one finds that $$\frac{\sigma L Z_s}{2} = \tanh^{-1} \frac{1}{\sqrt{\epsilon_R}}$$

from which $$\sigma L = \frac{2}{Z_s} \tanh^{-1} \frac{1}{\sqrt{\epsilon_R}}$$

Having solved for the optimum product of thickness L and the conductivity $\sigma$ of the semiconductor, one can obtain the desired conductivity for minimum reflection occurring at the first order quarter wavelength. In the example shown in FIG. 5, that is, a value of L equals 2.2 millimeter, $\sigma$ can be calculated as being 1.8. If $\sigma$ were varied from 0 to 1.8, therefore, the reflectivity $E_R/E_{IN}$ could be swung between 1 and 0. If, on the other hand, L were retained at 2.2 millimeters and the conductivity were varied between 2 and 6 the reflectivity would be swung between 0.06 and 0.53 or about 9 fold. This corresponds to an increase in reflected power $(E_R/E_{IN})^2$ of about 80 fold.

In practice, then, one using this mode of operation usually would select a semiconductor which is an odd number of quarter wavelengths thick and calculate the value of $\sigma$ necessary to satisfy the formula for $\sigma L$ previously mentioned. The millimeter imaging system for this mode of operation, shown in FIG. 6, would be similar to that shown in FIG. 3, except that the semiconductor panel 20 of FIG. 3 is replaced by the semiconductor panel 20 of FIG. 3 is replaced by the semiconductor panel assembly 200 shown in FIG. 6 wherein the semiconductor slab 50 is backed by a metallic reflector 52, which may be a metal coating.

Figure 6:
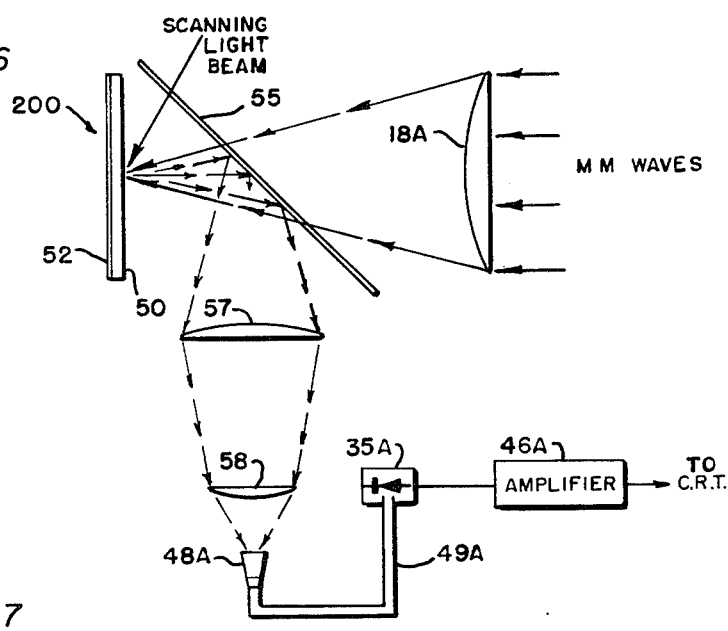
FIG. 6 describes another embodiment of the invention wherein the semiconductor panel comprises a fixed reflector.

In the reflection system shown in FIG. 6, another example of means for directing the energy reflected from the semiconductor panel assembly to a detector is shown. As shown in FIG. 6, the millimeter wave energy is focused by means of a collimating lens 18A onto the semiconductor 50. Millimeter wave energy reflected from the semiconductor 50 strikes the beam splitter 55 and a portion of this energy is reflected at right angles and is directed, by means of a lens system comprising lenses 57 and 58, to a horn 48A and fed via a waveguide 49A to the millimeter wave detector 35A. The output of detector 35A is amplified by amplifier 46A and supplied to the cathode ray tube indicator. The scanning light beam is indicated in FIG. 6 as illuminating the front surface of the semiconductor 50; however, as already explained, the scanning light beam could be made to illuminate the rear surface of the semiconductor 50, provided that the back reflector 55 were made of a perforate material capable of transmitting light energy, but totally reflective of millimeter wave energy.

It should be understood that the beam splitter arrangement shown in FIG. 6 could be used in the system of FIG. 1 instead of the horn and waveguide collecting system shown in FIG. 1, and that the latter arrangement may be used instead of the beam splitter and lens system in the millimeter wave imaging system of FIG. 6. The invention is not limited to any specific means for capturing the millimeter wave energy reflected from the semiconductor panel or to any specific means for directing this reflected energy to a suitable millimeter wave energy detector.

While the three-layer reflection system, either with or without a reflector, and with the semiconductor panel cut to a critical thickness, is an effective system, the modulation depth sometimes leaves something to be desired and the level of minimum transmission always present often is higher than one would like. It is desirable that substantially total absorption of millimeter wave energy in the semiconductor panel occurs when the semiconductor panel is in the minimum conductivity condition and that one be able to "tune" for minimum reflection to compensate for practical departures of $\sigma$ and L of a given semiconductor from calculated values.

In the four-layer reflection system about to be described, consisting of air, a semiconductor panel, an air gap and a metal reflector, millimeter and submillimeter waves can be substantially completely absorbed by the semiconductor if the conductivity and dielectric constant of the semiconductor, as well as the thickness of the semiconductor and the air gap length L, are chosen properly.

Figure 7:
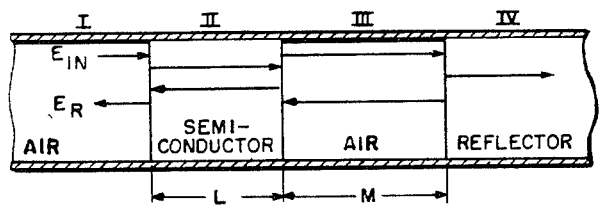
FIG. 7 is a view explaining principles of operation of a four-layer reflection system including a semiconductor spaced from a reflector.

This system may be considered as a transmission line, as indicated in FIG. 7, comprising a region I of air with propagation constant $\Gamma = \alpha + j\beta_0$ through which the millimeter wave energy is travelling, the semiconductor panel II of thickness L and propagation constant $\gamma = \alpha + jb$ upon which the radiation falls, a region III (air gap) of thickness M and propagation constant $\Gamma = \alpha + j\beta_0$ (or air $\alpha$ is assumed equal to zero), and a region IV or metal reflector, which, in practice, is adjustable and may be in the form of a fine metal wire mesh. The electric field incident on the semiconductor panel is represented as $E_{IN}$ and the reflected field as $E_R$. Reflection and transmission at the various layers is indicated by arrows in FIG. 7.

This system is analyzed in considerable detail in a U.S. Army Electronics Command Technical Report ECOM–2774 of October 1966 by Harold Jacobs, George Morris and Ronald Hofer entitled "An Interferometric Effect With Semiconductors in the Millimeter Wave Region."

In one example, calculations were made for a frequency 70 gigaHertz and a germanium semiconductor panel. The available semiconductor will have some quiescent or dark conductivity. One of the relationships which must be satisfied in order to obtain minimum reflection of millimeter wave energy from the semiconductor when the semiconductor is in the dark condition is $$\sigma L = \tan^{-1} \frac{1}{\sqrt{\epsilon_R}}$$

where $\epsilon_R$ is the dielectric constant of the semiconductor being used. The term $\alpha$ is given by $$\alpha = \frac{\sigma Z_s}{2}$$

where $Z_s$ is the impedance of the semiconductor at zero conductivity and is equal to the impedance $Z_0$ in free space divided by the square root of the dielectric constant $\epsilon_R$ of the semiconductor. The following relationship thus is obtained $$\frac{Z_s \sigma}{2} L = \tanh^{-1} \frac{1}{\sqrt{\epsilon_R}}$$

or, $$\sigma L = \frac{2}{Z_s} \tanh^{-1} \frac{1}{\sqrt{\epsilon_R}}$$

Since, for germanium, $\epsilon_R = 16$ and $Z_s = 377/\sqrt{16} = 94.25$, $$\sigma L = \frac{2}{94.25} \tanh^{-1} \frac{1}{\sqrt{16}}$$

or, $$\sigma L = 0.0212 \tanh^{-1} 0.25 = 0.0212(.255) = 0.00540$$

Figure 10:
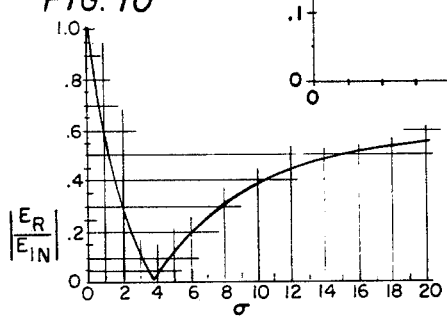
FIG. 10 shows the relationship between the reflection coefficient and the conductivity of the semiconductor when used in the system shown schematically in FIG. 7, with the movable reflector positioned to give minimum reflection in the quiescent condition.

If the semiconductor is cut to a thickness equal to an odd multiple of quarter wavelengths in the semiconductor, that is, if $$L = \frac{2n+1}{4} \lambda_s$$

where $n = 0, 1, 2, 3, \ldots$ typical curves showing the reflectivity $E_R/E_{IN}$ as the function of the normalized wavelength $X = M/\lambda_o$ in the air gap, with variations of $\sigma$, are shown in FIG. 10. The curves of FIG. 10 represent calculations made for an operating frequency at 70 gigaHertz and a semiconductor of germanium cut to a thickness $L = 9/4\lambda_s$. This represents an integer $n = 4$ in the expression $$\frac{2n+1}{4} \lambda_s$$

Similar curves could be obtained for $L = 0, 0.25\lambda_s, 0.75\lambda_s$, etc., where the $n$ value is other than 4. It will be noted that the reflectivity is a minimum when the air gap length $M$ is 0, $0.5\lambda_o$, $\lambda_o$, $1.5\lambda_o$, etc. The condition $M = 0$, of course, corresponds to the case of a reflector attached to the semiconductor, and is the case described in FIGS. 4 to 6.

By choosing an odd quarter wavelength of thickness L, one is able to obtain minimum reflection at half wavelength intervals of air gap M, provided, of course, that the relationship for L given above is satisfied. Minimum reflection, for a given $\sigma$, occurs for air gaps of $0\lambda_o$, $0.5\lambda_o$, $\lambda_o$, $1.5\lambda_o$, etc., and the lowest reflection obtainable at these particular air gaps, in the example illustrated in FIG. 8, occurs when $\sigma = 2.24815$, since, for a semiconductor precut to $L = 9/4\lambda_s = 9/4(1.072) = 2.4$ millimeters, this value of $\sigma$ satisfies the relationship that $\sigma L = 0.00540$.

The value of L selected will depend upon the application of the millimeter wave imaging system. The smaller one makes L, the larger is the viewing angle. In applications where one desires only a limited field of view, L would be chosen reasonably large; on the other hand, in applications in which a wide angle view is needed, L would be made fairly small.

In many practical cases it may be desirable to use a semiconductor which is not exactly an integral multiple of odd quarter wavelengths long, either because a semiconductor with a thickness of $$\frac{2n+1}{4} \lambda_s$$

is not available or is not readily machineable. Furthermore, one may have available a semiconductor of some quiescent conductivity which cannot be tailored to a semiconductor thickness, or vice versa, so as to satisfy the relationship $$\sigma L = \frac{2}{Z_s} \tanh^{-1} \frac{1}{\sqrt{\epsilon_R}}$$

Figure 8:
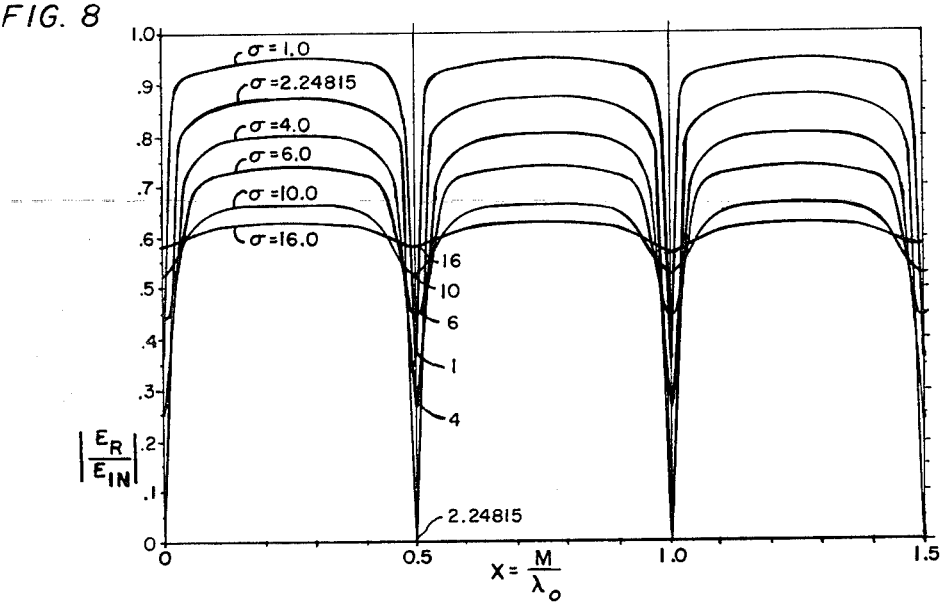
FIGS. 8 and 9 show the relationship between the reflection coefficient and the normalized spacing between the reflector and the semiconductor, for various values of conductivity, of a system such as shown schematically in FIG. 7.

For example, suppose one were able to cut the semiconductor slab represented by the curves in FIG. 8 to a thickness $L = 2.4$ millimeters, it would be necessary to specify a quiescent conductivity of 2.24815. It may not be easy to procure a semiconductor having this specified value of conductivity. On the other hand, suppose one were to have a semiconductor slab which happened to have $\sigma = 2.24815$, one might not have facilities for cutting this slab to a thickness exactly equal to 2.4 millimeters. It is for these reasons that the system using a movable reflector is of great practical significance.

In one example of a movable reflector system, calculations were made using a germanium semiconductor having a quiescent conductivity of 3.6 (ohm-meter)$^{-1}$. It is necessary now to calculate the thickness L to which the semiconductor is to be cut. The frequency of millimeter wave radiation in this example is 70 gigaHertz. As already mentioned, one of the relationships which must be satisfied in order to achieve minimum reflection of millimeter wave energy from the semiconductor is that $$\sigma L = \frac{2 \tanh^{-1} \frac{1}{\sqrt{\epsilon_R}}}{Z_s}$$

From previous calculations, the value of $\sigma L = 0.00540$. Since the conductivity of the semiconductor selected was 3.6 (ohm-meter)$^{-1}$, the thickness L is equal to $$\frac{0.00540}{3.6} \text{ or } 1.50 \times 10^{-3} \text{ meters}$$

It should be noted that, at 70 gHertz, the wavelength $\lambda_s$ in the germanium semiconductor panel is $$\frac{\frac{3.0 \times 10^8}{7 \times 10^{10}}}{\sqrt{16}} = \frac{4.28 \times 10^{-3}}{4}$$

$$= 1.07 \times 10^{-3} \text{ meters} = 1.07 \text{ millimeters}$$

In other words, $L = 1.405\lambda_s$ and is not a multiple of quarter wavelengths. In order to compensate for this fact, it is necessary to adjust M to satisfy the additional relationship $$\tan bL \tan \beta_o M = \frac{1}{\sqrt{\epsilon_R}}$$

referred to earlier in the application. Since $$b = \frac{2\pi}{\lambda_s} \text{ and } \beta_o = \frac{2\pi}{\lambda_o}$$

the second relationship becomes $$\tan \frac{2\pi}{\lambda_s} L \tan \frac{2\pi}{\lambda_o} M = \frac{1}{\sqrt{\epsilon_R}}$$

from which $$\tan \frac{2\pi}{\lambda_o} M = \frac{1}{\sqrt{\epsilon_R} \tan \frac{2\pi}{\lambda_s} L}$$

and $$\frac{2\pi}{\lambda_o} M = \tan^{-1} \frac{1}{\sqrt{\epsilon_R} \tan \frac{2\pi}{\lambda_s} L} + n\pi$$

the term $n\pi$ showing the repetitive nature of the tangent function. Solving for M, $$M = \frac{\lambda_o}{2\pi} \tan^{-1} \frac{1}{\sqrt{\epsilon_R} \tan \frac{2\pi}{\lambda_s} L} + \frac{n\lambda_o}{2}$$

Substituting known values $$M = \frac{4.28}{6.28} \tan^{-1} \frac{1}{\sqrt{16} \tan \frac{6.28}{1.07}(1.50)} + \frac{n\lambda_o}{2}$$

$$M = 0.681 \tan^{-1} \frac{1}{4(-0.725)} + \frac{n\lambda_o}{2}$$

$$M = 0.681 \tan^{-1} -0.345 + \frac{n\lambda_o}{2}$$

$$M = 0.681(-0.312) + \frac{n\lambda_o}{2}$$

$$M = -0.21 + \frac{n\lambda_o}{2}$$

It will be noted that the tangent values are repetitive at intervals of $\pi$ radians, so that in the equation, values of M differing by $n\lambda_o/2$ are possible. When $n$ equals zero, the distance M comes out negative, in the example given. Although this solution is physically unrealizable, one can obtain realistic solutions when $n$ is other than zero. For example, if $n=1$, the spacing $M=-0.21+4.28/2=-0.21+2.14=1.93$ millimeters. This value corresponds to a ratio of $M/\lambda_0=1.93/4.28=0.46$.

Figure 9:
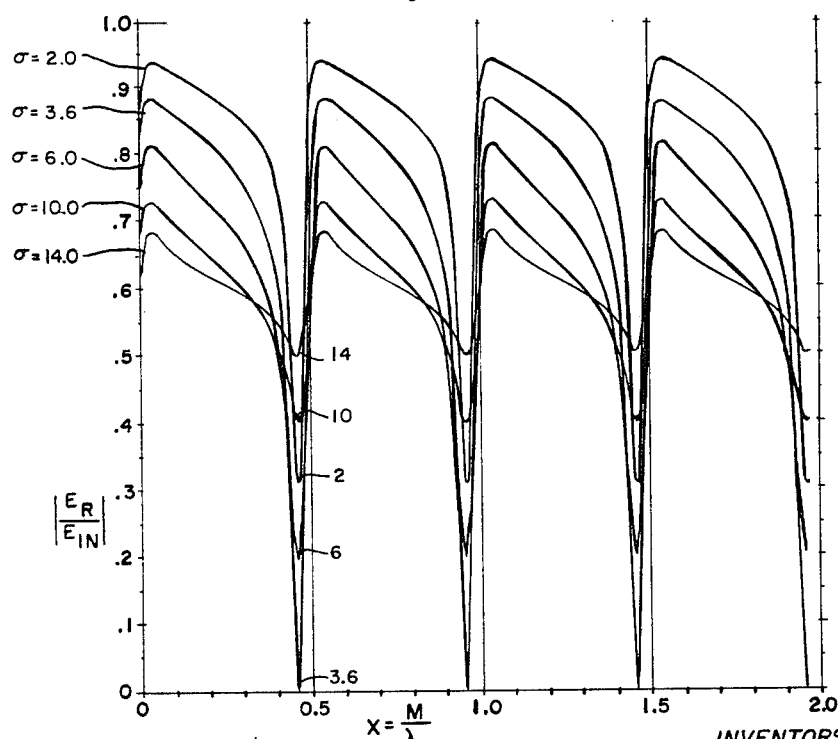

FIG. 9 shows typical computer curves of reflection coefficient $E_R/E_{IN}$ as a function of normalized air gap $X=M\lambda_0$ between semiconductor panel and movable reflector, for values of $\sigma$ from 0 to 14. The curves of FIG. 9 are for a germanium semiconductor at a frequency of 70 gHertz. The wavelength $\lambda_s$ in the germanium semiconductor then is 1.072 millimeters. From the curves, it is evident that a minimum reflectivity $E_R/E_{IN}$ can be obtained at half wavelength intervals of the air gap (medium III of FIG. 7), that is, when $X=0.5$, 1.0, 1.5. . . . As the conductivity $\sigma$ of the panel (medium II) is changed by visible light, the reflectivity of the panel will change. For example, if the air gap M is made $0.5\times1.072=0.536$ millimeter, then, as $\sigma$ increases from 2.248 to 16, the reflectivity increases from 0 to 0.62. A decided change in reflectivity can also occur when the normalized spacing X is increased to about $2.15+1.94=4.09$ millimeters (corresponding to a normalized spacing $X=4.09/4.28=0.96$). The calculated curves of FIG. 9 show that the minimum reflection points are spaced at intervals of half wavelengths in free space.

The manner in which the reflectivity of the semiconductor panel varies with conductivity is shown in FIG. 10. The specific curve of FIG. 10 is for a system operating at 70 gHz. with the semiconductor panel being cut to a thickness of 1.485 millimeter and the air gap or spacing M between the semiconductor and the movable reflector being 0.455 wavelength, one of the values of X shown in FIG. 9 which provide minimum reflection in the quiescent condition. The reflectivity $E_R/E_{IN}$ is seen to increase progressively as the conductivity increases from 4 to 20 (ohm-meter)$^{-1}$.

Figure 11:
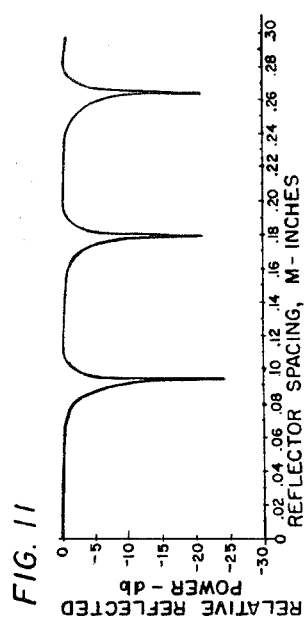
FIG. 11 shows a graph of experimental data indicating the relationship between the relative reflected power and the reflector spacing, for the system shown in FIGS. 7 and 13.

FIG. 11 shows the relative reflected power in db—10 log $(E_R/E_{IN})^2$—for various spacings, in inches, of the reflector from the semiconductor. This curve is a plot of experimental data derived for operation at 70 gHz. with $\sigma=3.6$ reciprocal ohm meter and L is equal to 1.50 millimeters with a germanium panel. The zero db point represents the point of maximum reflected energy detected by the millimeter wave detector. It should be noted that the reflected power is sharply reduced when the air gap M is an integral number of wavelengths and that the minimum reflected power may be obtained for reflected spacings at intervals of half wavelengths.

Figure 12:
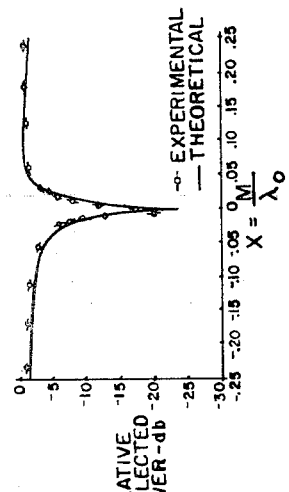
FIG. 12 is a curve showing a comparison of the theoretical and experimental values for the relationship between the relative reflected power and the deviation in spacing between reflector and semiconductor, in normalized units, from the location at which minimum reflection is attained for the system shown in FIGS. 7 and 13.

FIG. 12 illustrates a comparison of experimental with theoretical (computer) values for the relationship between relative reflected power and the deviation in the spacing between the movable reflector and the semi-conductor, in normalized units $X=M/\lambda_0$, from the location at which minimum reflection is obtained. This curve indicates clearly the agreement between the calculated results and those actually obtained in practice. This curve is related to that of FIG. 11, except that it shows the relative reflected power as a function of deviation from the null tuner location rather than the reflected power in terms of the actual location of the tuner or reflector. In FIG. 12, the curve is drawn through theoretical data points and the experimental points are indicated by a circle.

Figure 13:
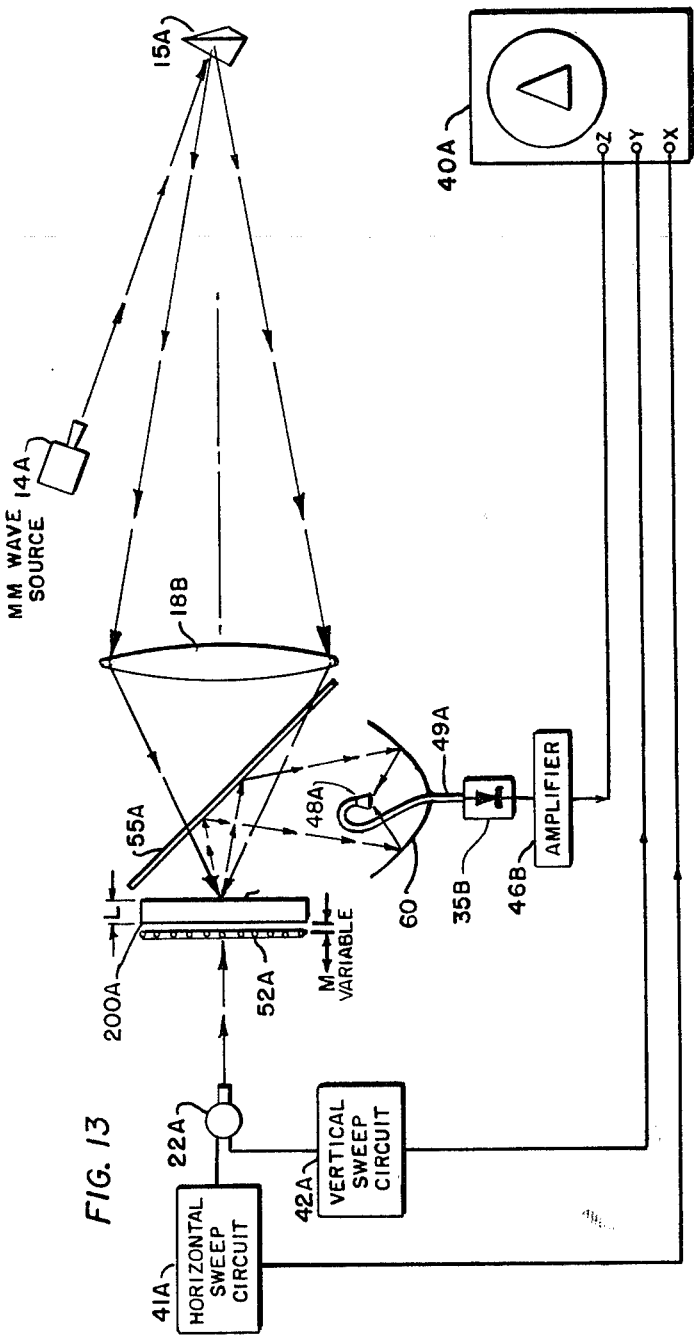
FIG. 13 is a system diagram showing the preferred embodiment of the invention which employs a movable reflector.

A reflection type millimeter wave imaging system using a movable reflector is shown in FIG. 13. As in the system of FIG. 1, the millimeter wave energy from a source 14A floods an object 15A which, in turn, becomes a source of millimeter wave radiation. The millimeter wave energy reflected from object 15A is focused by lens 18B onto the semiconductor panel 50A of panel assembly 200A and a millimeter wave image is absorbed in semiconductor panel 50A. A reflector 52A is positioned in back of semiconductor panel 50A and is adjustable mechanically, as indicated schematically by the heavy arrows, so that the air gap or spacing M between the reflector 52A and the semiconductor 50A can be varied. The reflector 52A can be a solid movable reflector, disposed adjacent the back surface of the semiconductor panel; preferably, however, the reflector 52A is in the form of a wire mesh having openings of such size as to be transparent to light energy but substantially totally reflective of millimeter wave energy. If a perforate reflector is used, as shown in FIG. 13, the light scanner 22A, which may be similar to the scanner described in connection with the system of FIG. 1, can be located behind the reflector and the scanning light beam directed through the mesh reflector onto the back surface of the semiconductor. Since the conductivity change accomplished in the semi-conductor is a volume effect, it is immaterial whether the light beam scans the front or the back surface of the semi-conductor panel. In other words, the scanner may be positioned in front of the semiconductor panel 50A, that is, between the lens 18B and the semi-conductor panel 50A. The scanning light beam, passing through the mesh reflector 52A, creates localized regions of increased conductivity in the semiconductor panel 50A. When the millimeter wave energy absorbed in the semiconductor panel is scanned with the light beam, each time the light spot strikes a portion of the millimeter wave image, the energy reflected from the panel will be increased. By means of a beam splitter 55A, a portion of this reflected energy can be directed toward a millimeter wave detector. The beam splitter may include a partially transmitting layer oriented at 45 degrees to the path of the incoming millimeter wave energy and so constructed to permit a portion of incident millimeter wave energy to pass through to irradiate the semiconductor, but also to allow a portion of the millimeter wave energy reflected from the semiconductor panel to be directed off to the side, as shown in FIG. 13. This portion of the reflected energy from the semiconductor can be detected by means of a millimeter wave detector 35B connected, for example, by way of a waveguide 49A to a horn 48A positioned at the focal point of a parabolic reflector 60. The detector output is amplified by amplifier 46B and applied to the Z axis of cathode ray tube 40A.

It is to be understood that the millimeter wave energy reflected from the semiconductor panel assembly of FIG. 13 can be fed to a horn positioned between the semiconductor 50A and the lens 18B, and the detector coupled to the horn by waveguide, as indicated in FIG. 3. The advantage of the beam splitting arrangement is that an increased angle of view can be obtained, compared with that of the collector horn positioned between the semiconductor panel and the collecting lens. The area of the horn is relatively small compared to the aperture of the lens, however, so that the interposed horn does not present serious problems of interference with the incoming millimeter wave energy. A disadvantage of the beam splitting method, however, is that a certain portion of the energy reflected from the panel is lost in transmission through the mirror 55A.

As in the case of the systems previously described, the scanning of the light beam across the semiconductor panel 50A is synchronized with the electron beam raster at the cathode ray tube 40A. The horizontal and vertical sweep circuits 41A and 42A, respectively, are connected to the X and Y terminals of the cathode ray tube 40A. These sweep circuits 41A and 42A, although shown in FIG. 13 as external to cathode ray tube 40A, may be located physically within the cathode ray tube itself.

At this point, a summary of the position of the light scanning means will be mentioned. In the reflection type system using a fixed solid back reflector, as shown in FIG. 6, obviously it would be necessary to illuminate the front of the semiconductor panel. If, however, the back reflector is perforate rather than solid, the light scanner could be positioned to illuminate either surface. This is true also of the reflection system using the movable reflector. As in the case of the system shown in FIG. 6, the reflector of FIG. 13 could be of solid construction rather than being of mesh. However, this decreases the flexibility of the system, since the scanning light beam would have to be directed onto the front surface of the semiconductor panel.

What is claimed is:

1. A millimeter wave imaging system comprising a layer of semiconductor material the conductivity of which can be changed in response to energy from a scanning means, means for irradiating said layer with millimeter wave energy to form a millimeter wave image on said layer, means for sequentially sampling discrete portions of said layer to affect the amount of millimeter wave energy reflected from said discrete portions of said layer, and means controlled in response to said sampling for providing a visual indication of said millimeter wave image.

2. A millimeter wave imaging system in accordance with claim 1 wherein said system includes a fixed reflector of millimeter wave energy integral with said layer.

3. A millimeter wave imaging system in accordance with claim 2 wherein said reflector is transparent to energy from said scanning means.

4. A millimeter wave imaging system in accordance with claim 1 wherein said system includes a member reflective of millimeter wave energy, the spacing between said member and said layer being adjustable.

5. A millimeter wave imaging system comprising a layer of semiconductor material having a thickness equal to integral portions of a wavelength in the semiconductor material at the operating frequency of said system, means irradiating said layer with millimeter wave energy to form a millimeter wave image on said layer, scanning means for illuminating sequentially discrete regions of said layer to produce momentary changes in conductivity of said discrete regions, said conductivity changes affecting the amount of millimeter wave energy emanating from a surface of said layer, means for detecting the emanating millimeter wave energy, and visual indicating means supplied with said detected energy and synchronized with said scanning means.

6. A millimeter wave imaging system according to claim 5 wherein said portion are halves.

7. A millimeter wave imaging system according to claim 5 wherein said portion are odd quarters.

8. A millimeter wave imaging system according to claim 5 wherein said wave energy is reflected from said layer.

9. A millimeter wave imaging system according to claim 6 wherein said wave energy is reflected from said layer.

10. A millimeter wave imaging system according to claim 7 wherein the number of odd quarter wavelengths is selected for maximum change in reflection of millimeter wave energy for a given value of conductivity.

11. A millimeter wave imaging system according to claim 7 wherein said layer includes a reflector of millimeter wave energy integral therewith.

12. A millimeter wave imaging system according to claim 11 wherein said reflector is transparent to energy from said scanning means.

13. A millimeter wave imaging system comprising a panel assembly including a layer of semiconductor material having a thickness L and a movable reflector of millimeter wave energy spaced from said layer by an adjustable distance M, means for irradiating said layer with millimeter wave energy to form a millimeter wave image on said layer, scanning means for illuminating sequentially discrete regions of said layer to produce momentary changes in conductivity $\sigma$ of said discrete regions, said conductivity changes affecting the amount of millimeter wave energy reflected from said panel assembly, means for detecting the reflected millimeter wave energy, and visual indicating means supplied with said detected energy and synchronized with said scanning means, the product of the thickness L and the conductivity $\sigma$ of said layer being given by the relation $$\sigma L = \frac{2}{Z_s} \tanh^{-1} \frac{1}{\sqrt{\epsilon_R}}$$

where $Z_s$ is the wave impedance of said layer and $\epsilon_R$ is the dielectric constant of said layer, and the spacing M is adjusted to satisfy the relation $$M = \frac{\lambda_o}{2\pi} \tan^{-1} \frac{1}{\sqrt{\epsilon_R} \tan \frac{2\pi}{\lambda_s} L} + \frac{n\lambda_o}{2}$$

where $\lambda_o$ is the wavelength in free space and the $\lambda_s$ the wavelength in said layer at the operating frequency of said system, and $n$ is an integer.

14. A millimeter wave imaging system according to claim 13 wherein said movable reflector is transparent to energy from said scanning means and totally reflective of said millimeter wave energy.

References Cited

UNITED STATES PATENTS

| | | | |
|---|---|---|---|
| 3,050,725 | 8/1962 | Kueckew | 343—17 |
| 3,243,784 | 3/1966 | Anderson et al. | 343—17 X |
| 3,305,863 | 2/1967 | Jacobs | 343—18 |

RICHARD A. FARLEY, *Primary Examiner.*

J. P. MORRIS, *Assistant Examiner.*